C. J. HOLUB.
LAUNDRY DRIER.
APPLICATION FILED SEPT. 13, 1915.
1,254,595.
Patented Jan. 22, 1918.
3 SHEETS—SHEET 1.
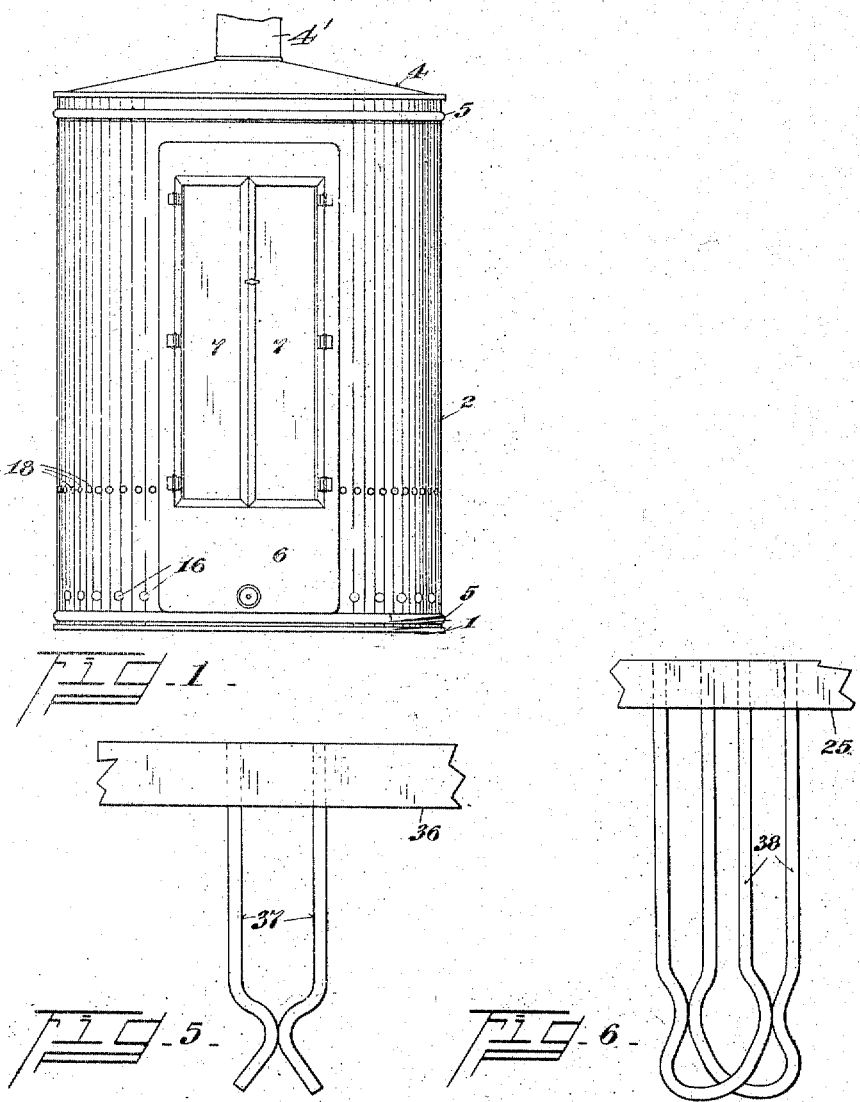

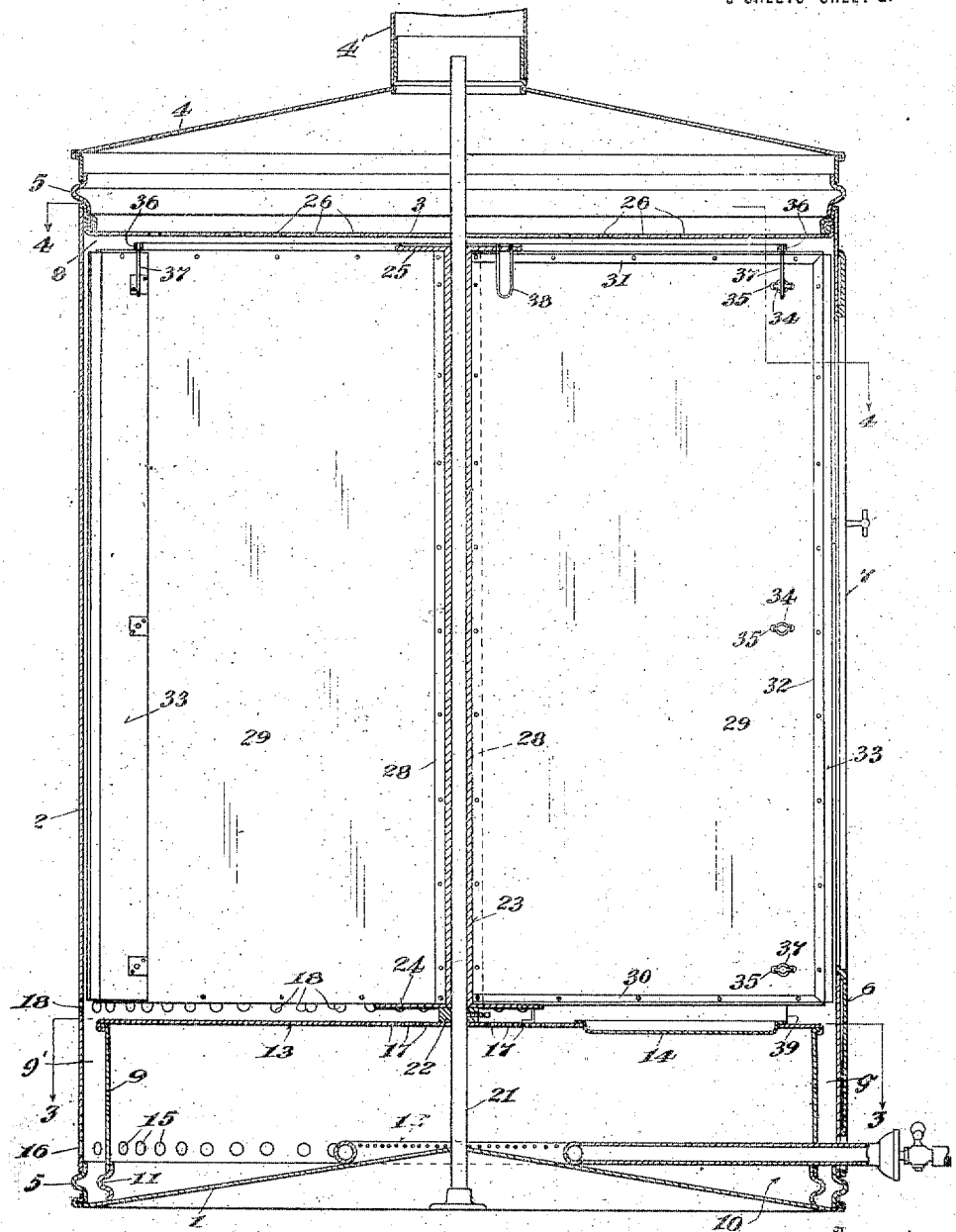

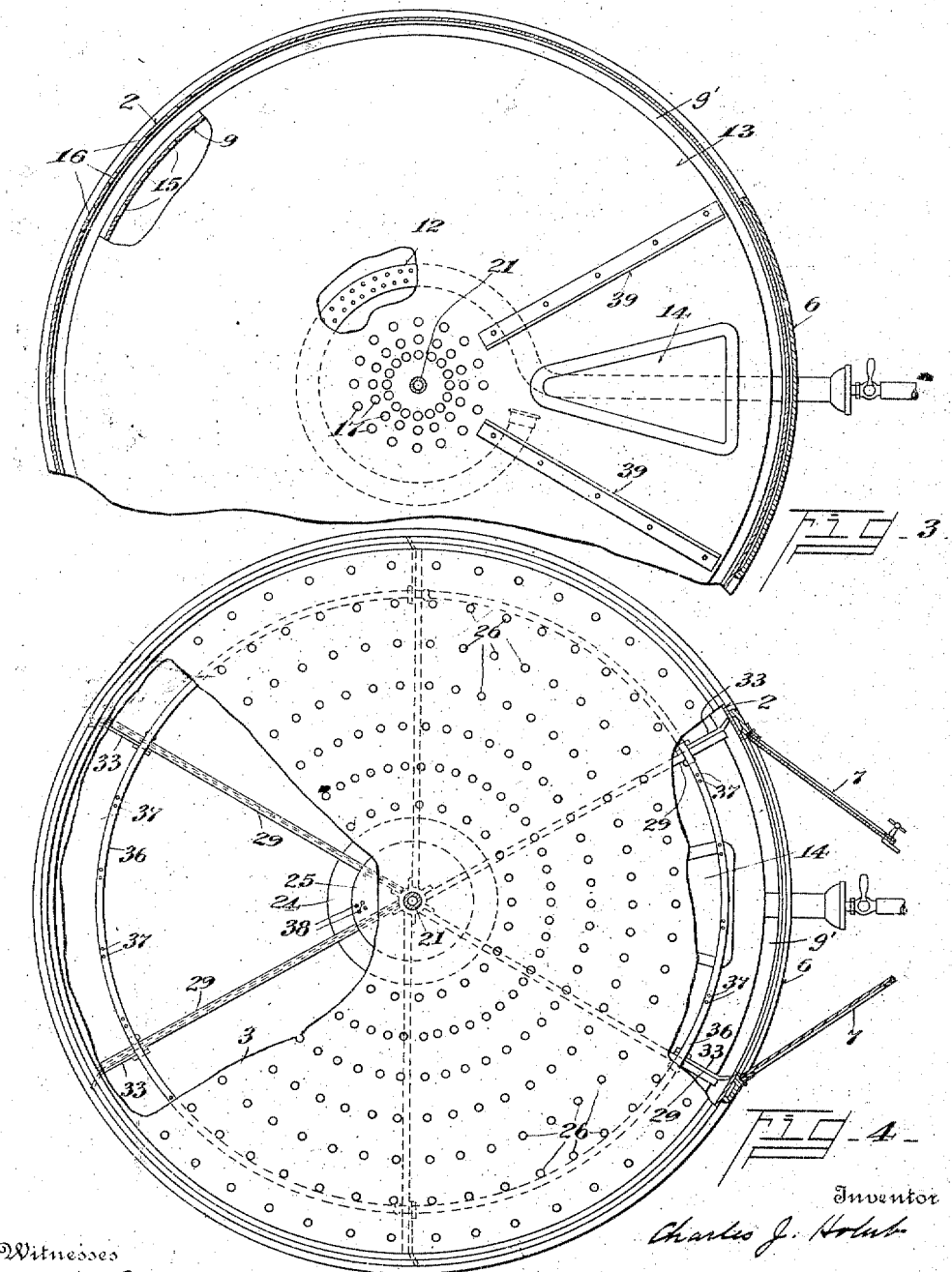

UNITED STATES PATENT OFFICE.

CHARLES J. HOLUB, OF NEWPORT, KENTUCKY, ASSIGNOR TO THE WILLIAMSON HEATER COMPANY, OF CINCINNATI, OHIO, A CORPORATION OF OHIO.

LAUNDRY-DRIER.

1,254,595.

Specification of Letters Patent.

Patented Jan. 22, 1918.

Application filed September 13, 1915. Serial No. 50,283.

*To all whom it may concern:*

Be it known that I, CHARLES J. HOLUB, a citizen of the United States, and residing at Newport, in the county of Campbell and State of Kentucky, have invented a new and useful Improvement in Laundry-Driers, of which the following specification is a full disclosure.

My invention relates to a drier of the type generally used as a laundry drier in which heated air is circulated through the drier chamber.

The object of this invention is to provide a cylindrical drier having a rotatable work supporting unit.

Another object is to provide a cylindrical drier having a heat radiating unit near the base thereof, the drier casing being apertured to cause air currents to be entrained to and derive heat from said heat radiating unit.

The features of my invention will be more fully set forth in the description of the accompanying drawings, forming a part of this specification, in which:—

Figure 1 is a front elevation of the drier. Fig. 2 is a central vertical section. Fig. 3 is a plan section on line 3—3 of Fig. 2. Fig. 4 is a plan section on line 4—4 of Fig. 2. Fig. 5 is an enlarged front elevation of one of the front work supporting clips, and Fig. 6 is an enlarged perspective view of one of the rear work supporting clips.

As illustrated in the drawings, the casing is constructed of sheet metal and consists of a conical base plate 1, a cylindrical body or outer casing 2, a perforated top plate 3, and a conical hood 4 having a central vent opening and flue connection 4'. The base, body and hood are detachably united by beaded reinforcing rings 5—5, or they may be joined in any other well-known manner. The body portion 2 is provided with an entrance opening, marginally surrounded by a door plate 6 supporting the hinged doors 7—7, as a closure for the drier chamber 8. Within the lower portion of the body 2 and concentric therewith is a relatively shallow inner casing 9 defining a burner or heat radiating chamber 10. Said inner casing 9 is spaced from the outer casing 2 to form an annular air flue 9' and seats on a beaded reinforcing ring 11 resting on the base plate 1. A gas burner 12 supported centrally on the base plate 1 within the chamber 10 is provided with a supply pipe projecting radially and through the casings 9 and 2 and door plate 6, embodying a suitable mixer and valve exterior of the casings. The top plate 13 of the casing 9 has an opening for accessibility into the burner chamber and to the burner, chiefly for ignition purposes, with the opening normally sealed by a removable cover 14. The casing 9 circumferentially and preferably toward the base is provided with a row of apertures 15 for admitting air into the burner chamber. The outer casing or body portion 2 has corresponding apertures 16 but disposed preferably staggered or offset relatively to the apertures 15 to avoid direct air paths through the casings and thus prevent excessive drafts to the burner. A second row of apertures 18 is formed in the casing 2 above the burner chamber. Apertures 17 in the central portion of the burner chamber top plate 13 permit the escape of the products from said chamber.

The drier chamber 8 contains a rotatable work support which as a unit is formed of six vertically disposed partition plates defining separate work-receiving compartments.

A vertical rod 21, extending through and centrally disposed within the burner and drier chambers, rests in a suitable fitting on the floor and serves as a pivot for the work supporting unit. A collar 22 is secured by a set-screw to the rod 21 and upon this collar rests the journal sleeve 23 which extends approximately the entire height of the drier chamber and terminates at both ends with circular flanges 24—25.

Radial ribs 28 projecting from the journal sleeve 23 extend the full height thereof and to these ribs the inner vertical edges of the partition plates 29 are secured. These partition plates are reinforced by margin strips 30—31 and 32, the strips 30 and 31 being secured at their inner ends to the flanges 24—25, respectively. Each partition plate is provided with a radially adjustable filler strip 33 detachably secured along its outer edge by thumb-screws 34, which engage in elongated slots 35 in the plates. These filler strips insure a substantially close fit of the partitions relative to the casing. When emptying or filling the separate work-receiving compartments, the work supporting unit is positioned to bring the outer edges of two adjacent partitions on opposite sides of the door opening, the filler strips 33 preventing the heated air in the adjacent compartments from escaping through the door opening, to the inconvenience of the operator.

I also provide two radial ribs 39 projecting upwardly from the top plate 13 of the burner chamber in vertical alinement with the partition plates when in the above described position on opposite sides of the door opening. These ribs fill in the space between said top plate 13 and the lower edges of the partition plates and retards the air circulation in the compartment then in registry with the door opening thereby preventing the heated air in the adjacent compartments from escaping beneath said partition plates and through the door opening.

A spacing bar 36 rests on and is secured to the top margin strips 31 of the partition plates 29 and is provided with a series of work supporting clips 37 (one of which is shown in detail in Fig. 5) projecting downwardly within the several separate work-receiving compartments of the work supporting unit. A second series of work supporting clips 38 of the form shown in Fig. 6 are secured to and project downwardly from the top plate 25 of the journal sleeve 23, one within each separate compartment.

The top plate 3 of the main casing is provided with vent apertures 26 to escape the products from the drier chamber to the flue. The lower flange 24 of the journal sleeve 23 serves as a baffle plate, protecting the work against a direct action of the gas flame, guarding the apertures 17 against dropping moisture and as a collector plate, separating and retaining the soot and grease contained in the gas fumes, before said fumes enter the drier chamber.

The various articles to be dried are strung back and forth between the outer series of clips 37 and the inner clips 38 in any desired manner, or hung separately on each clip. To adapt the drier for some specific uses it may be desirable to provide a greater number of work supporting clips in each compartment and to this end the work supporting unit may be provided with additional bars 36.

When used as a laundry drier, the preferred method is to place one edge of a piece of work in the first clip 37 next to the partition to the right of the door opening, then in the inner clip 38, stringing back to the second clip 37 and back again to the inner clip, etc., the inner clip being positioned to one side of the compartment to allow sufficient hand room to facilitate the work hanging operation.

The air entrained through the drier chamber derives heat partly through direct entrainment through the burner chamber and partly by absorbing the heat radiating from the walls of said chamber. As there is no direct path by which the air drawn through the apertures 16 can be forced through the apertures 15, the amount of air drawn into the burner chamber is restricted to the combined area of the escape apertures 17 in the top plate 13 thereof, and as this area is relatively small only a small amount of the total entrained air derives heat by direct contact with the gas flame.

The major portion of the air drawn in through the apertures 16 is directed upwardly along and absorbes heat radiating from the wall 9 of the burner chamber. The air drawn in through the apertures 18 combines with this upward current of heated air and the combined air body is further heated by direct contact with the heated top plate of the burner chamber.

The capacity of the drier is preferably such that the time allotted for filling is sufficient for drying the work in the compartment first filled, offering a continuous operation, wherein, at each partial rotation of the work supporting unit, a compartment of dried laundry is presented at the door opening for removal, said compartment remaining for refilling and then moved past the door opening for a subsequent drying operation.

When the drier is filled with heavy articles, such as for instance, blankets, which require a substantially longer time for drying, the work supporting unit is rotated to bring the partitions intermediate of the ribs 39 to permit a free circulation of heated air through and between all of the compartments, during the drying period.

While I have shown a gas burner as the heater means, any other form of heater element may be employed without departing from the broad principle of this invention.

Having described my invention, I claim as new and desire to secure by Letters Patent of the United States:—

1. A device of the nature disclosed comprising an outer casing forming a drier chamber, a rotatable work support therein, an inner casing below said work support forming a heating chamber, a heater element within said heating chamber, the heating chamber being provided with escape apertures to permit the escape of the products therefrom, and means for deflecting said products and guarding the escape apertures.

2. A device of the nature disclosed comprising an outer casing forming a drier chamber, a perforated top plate therefor, a vented hood extending above the top plate, a rotatable work support in said chamber, an inner casing below the work support forming a heating chamber, both casings being apertured to maintain air circulation through both chambers and a heater element within the heating chamber.

3. A device of the nature disclosed comprising a casing forming a drier chamber, a work support journaled therein comprising an elongated journal sleeve having a flanged upper end, work supporting clips carried thereby, a series of partition plates secured to and radiating from the journal sleeve, a spacing bar secured to the partition plates, work supporting clips depending from the spacing bar and a heat radiating element below the work support.

4. A device of the nature disclosed comprising a cylindrical casing forming a heating chamber and provided with a series of air intake openings, a top plate for said chamber having escape apertures to permit the escape of the products therefrom, a heater element within said heating chamber, an outer cylindrical casing surrounding and spaced from the heating chamber forming therewith an annular air flue and extended above the heating chamber to form a drier chamber, the outer casing being provided with two series of air intake openings, one series disposed adjacent the heating chamber top plate and the other series disposed adjacent the base of the heating chamber in non-registering alinement with the air intake openings of the heating chamber and a work support journaled in the drier chamber above the heating chamber.

5. A device of the nature disclosed comprising a casing forming a drier chamber having a door opening affording access to said chamber and apertured to maintain air circulation therethrough, a work support journaled in the drier chamber and formed of a series or partition plates defining separate work receiving compartments adapted to be moved into registry with the door opening, means retarding the air circulation through any one of the work receiving compartments when in registry with the door opening, and a heat radiating element within the casing below the work support.

6. A device of the nature disclosed comprising a cylindrical casing forming a heating chamber, a heater element in said chamber, an outer cylindrical casing surrounding and spaced from said heating chamber casing forming therewith an annular air flue and extended above the heating chamber to form a drier chamber, both casings being apertured to maintain air circulation through both chambers, and a work support journaled in the drier chamber above the heating chamber.

In witness whereof, I hereunto subscribe my name, as attested by the two subscribing witnesses.

CHARLES J. HOLUB.

Witnesses:
CLARENCE B. FOSTER,
L. A. BECK.